United States Patent Office 3,533,982
Patented Oct. 13, 1970

3,533,982
PROCESS FOR THE PREPARATION OF A RUBBER CEMENT FROM A LATEX
Ernst Schmidt and John H. Williams, Akron, Ohio, assignors to The Firestone Tire & Rubber Company, Akron, Ohio, a corporation of Ohio
Filed Aug. 2, 1966, Ser. No. 569,646
Int. Cl. C08c 1/02; C08d 11/00; C08j 1/48
U.S. Cl. 260—34.2                                    17 Claims

ABSTRACT OF THE DISCLOSURE

A method of transferring an elastomeric polymer from a latex to a solvent for the polymer and the preparation of a rubber cement by mixing a fraction of one percent of a sensitizing agent with the latex, adding a solvent with the sensitizing agent or thereafter, adding an acid and separating aqueous effluent and forming a cement.

---

The invention relates to a process for transferring an elastomeric polymer from an aqueous latex directly to a solvent for the polymer which is in contact with the latex as an immiscible phase.

Figure 1:
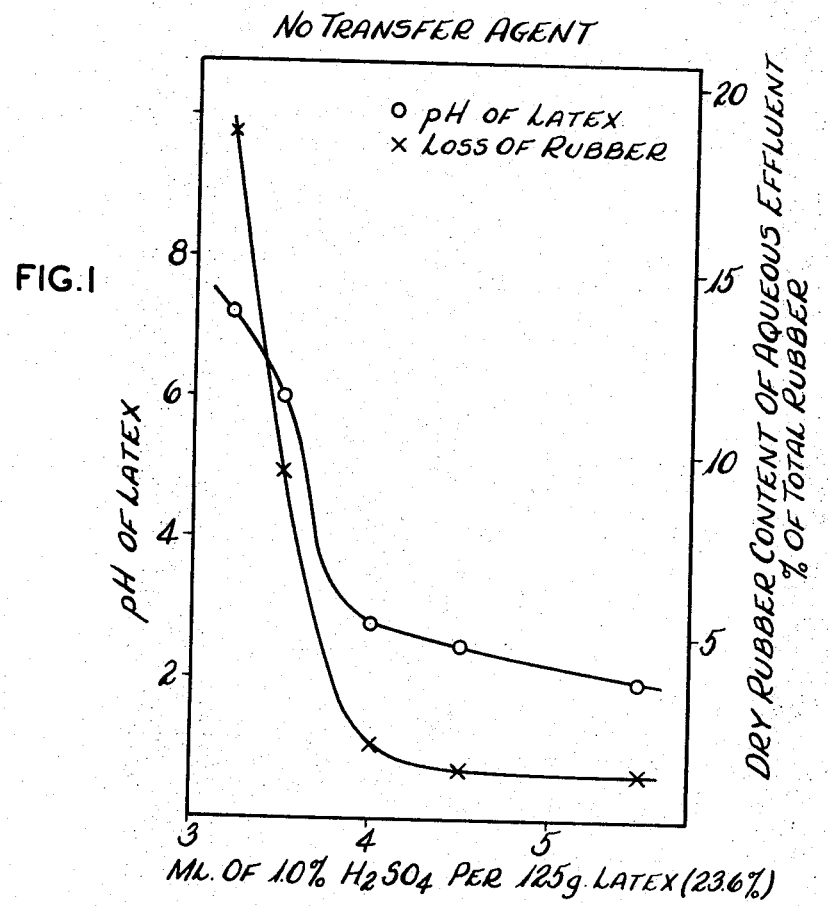

Transfer processes which employ a salt have been used, but they produce a product of high ash content and the ash contaminants give physical properties to the product which may be undesirable. The transfer with acid alone is not complete, particularly at near neutral pH as shown in FIG. 1. Furthermore, acidic materials, used alone, are undesirable because of their corrosive effect on the equipment, the effect of the acid on other additives, etc. Although acid may be removed by prolonged washing, this is expensive and may be otherwise objectionable.

Simple admixture of a cement-forming elastomer solvent with a latex does not effect sufficiently complete transfer of the polymer to the hydrocarbon for a commercial operation. According to this invention, transfer to a solvent is done at a commercially feasible rate with substantial completion at any desired pH from very low pH to above neutral. This is done either by sensitizing the latex in the presence of the elastomer solvent or by the subsequent addition of the solvent to the sensitized latex and by the addition of an acid with agitation as herein more fully explained.

The process is applicable to elastomeric polymers which are dispersed as an aqueous latex in which part or all of the dispersing agent is an acid-decomposable soap. The term "elastomer" is used herein in a generic sense to include homopolymers, copolymers, block copolymers, etc. The latexes include, for example, latexes of polybutadiene, polyisoprene, butadiene-isoprene copolymers, butadiene-styrene copolymers (SBR), isoprene-styrene copolymers, natural latexes, neoprene latexes, water dispersions of reclaimed natural and/or synthetic rubbers, and other known latexes of hydrocarbon or halogenated hydrocarbon synthetic rubbers. The latexes also include latexes of polymers such as polyisoprene, polybutadiene, butadiene-styrene copolymers, butyl rubber, EPM and EPDM derived commercially from non-aqueous cements or obtained by bulk polymerization—latexes in which the dispersion of the rubber particles is due entirely or at least partially to the presence of an acid-decomposable soap. The reference to polymers is not made in a limiting sense and includes the linear as well as the non-linear polymers.

One or more different elastomer latexes can be mixed with the elastomer latex prior to transfer of the elastomer to the cement. Also, one or more different elastomers, in cement form, as a powder or other finely divided form, can be admixed with the solvent or the transferred elastomer cement.

Concentration of the elastomeric polymer in the latex will vary, depending upon the nature of the latex available. The concentration of the polymer in the cement will also vary, depending upon the viscosity of the cement required, the amount of solvent used, the temperature of the process, the solubility and dispersibility of the polymer in the solvent, the nature of the solvent, etc. After completion of the transfer, separation of the aqueous phase from the cement is accomplished most readily if the viscosity of the cement is not too low. Pigments such as carbon black are more readily dispersed in cements of lower viscosity rather than in cements of higher viscosity. Also, less viscous cements are more readily handled than more viscous cements. The cement may be either a dispersion or a solution, depending upon the elastomer and the solvent and the concentration of the elastomer in the solvent. The terms "solvent" and "elastomer solvent" are used herein to include non-aqueous liquids immiscible with the aqueous medium of the latex and compatible with the elastomer; and the terms include aliphatic hydrocarbons such as pentanes, hexanes, heptanes, octanes, butenes, pentenes, hexenes, heptenes, octenes, etc.; aromatic hydrocarbons such as benzene, toluene, xylene, and cyclic and/or heterocyclic aliphatic hydrocarbons such as cyclohexane, cyclohexene, terpenes, etc., and also halo-derivatives such as carbon tetrachloride, tetrachlorethylene, etc. which may be used in exceptional situations. Mixtures of any of the preceding solvents may be used. Plasticizers and extending oils can also be used as solvents.

According to this invention the latex is sensitized by the addition of a fraction of a percent of a sensitizing agent, and the conversion of the elastomer from the latex phase to a cement phase, in the solvent employed, is made with agitation and, optionally, controlled acid addition. The transfer is substantially complete, is effected rapidly, and the pH of the aqueous medium of the latex may be varied so that the resulting cement is not sufficiently acid to affect the equipment or additives.

The term "latex" is used herein to refer to an aqueous dispersion of an elastomer. The term "cement" is used in a general sense to refer to solutions of the polymer in a solvent, in which there is normally dispersed an aqueous phase.

The preferred sensitizing agent gives rapid and substantially complete transfer of elastomer at various pH values between 1.0 and 7.5.

Most effective sensitizing or transfer agents can be generally characterized as water-soluble polyethers of a molecular weight of about 4,000 to 27,000, preferably containing hydrophobic groups, and include, for example, the following:

(1) The reaction product of a polyalkylene oxide (polyethylene oxide or polypropylene oxide-polyethylene oxide) and a coupling agent exemplified by:

(a) a diepoxide, e.g. reaction product of epichlorhydrin and a bisphenol. A commercial product is Carbowax 20M which is the addition product of polyethylene glycol of substantially 6000 molecular weight and a diepoxide of epichlorhydrin and a bisphenol, the addition product having a molecular weight of ca. 15,000 to 20,000;

(b) a diamine, e.g. ethylene diamine, propylene diamine, or any of the commercially available condensed derivatives thereof (polyalklene polyamines containing 2 to 4 carbon atoms), e.g. tetraethylenepentamine. A preferred commercial product is Tetronic 908 (a surface-active agent with molecular weight ca. 27,000 prepared by the sequential addition of propylene and ethylene oxides to ethylene-diamine);

(c) diisocyanates, preferably aromatic diisocyanates, e.g. the commercial reagents used in making polyurethane foam which include aliphatic, alicyclic and heterocyclic polyisocyanates, e.g.

3,3'-dimethoxy-4,4'-diphenylene diisocyanate
ethylene diisocyanate
propylene diisocyanate
butylene diisocyanate
ethylidene diisocyanate
cyclopentadiene-1,3-diisocyanate
hexylene-1,6-diisocyanate
cyclohexylene-1,4-diisocyanate
cyclohexylene-1,2-diisocyanate
2,4-toluylene diisocyanate
2,6-toluylene diisocyanate
4,4'-diphenylurethane diisocyanate
4,4'-biphenylene diisocyanate
3,3'-dichloro-4,4'-biphenylene diisocyanate
2,2-diphenyl-propane-4,4'-diisocyanate
p-phenylene diisocyanate
m-phenylene diisocyanate
xylene diisocyanate
1,4-naphthylene diisocyanate
1,5-naphthylene diisocyanate
diphenyl-4,4'-diisocyanate
diphenylsulfone-4,4'-diisocyanate
dichlorohexamethylene diisocyanate
tetramethylene diisocyanate
azobenzene diisocyanate
pentamethylene diisocyanate
hexamethylene diisocyanate
1-chlorobenzene-2,4-diisocyanate
furfurylidene diisocyanate
triphenylmethane triisocyanate
4,4'-dimethyl diphenyl methane-2,2',5,5'-tetraisocyanate
1,3,5-triisocyanate benzene
4,4',4''-triisocyanatotriphenylmethane
2,4,6-triisocyanate toluene (2) Polyethylene - polypropylene oxide block copolymer. Commercial products are Pluronic F-108 (molecular weight ca. 16,300) and Puronic P-75 (molecular weight ca. 4,000).

(3) Polyethylene oxide. A commercial product is Polywachs 12000 (molecular weight ca. 11,000 to 12,000).

The preferred commercial products are Carbowax 20M, Tetronic 908 and Pluronic F-108.

Polyvinylmethyl ether has also been found effective.

Any acid may be used in making the transfer which converts the soap to salt and non-stabilizing fatty or other acid. Acids are preferred which are not soluble in the solvent used. Mineral acids are usually preferred, and especially sulfuric acid for economic reasons. Examples of other acids which have been used include acetic acid and formic acid.

On cessation of the agitation, there is a phase inversion as most of the water quickly separates from the cement and may be easily decanted. The separated water is substantially free of polymer. Any retained water makes the cement more fluid. Known processes such as centrifuging, mild agitation, etc. may be used to separate some of the remaining water, if desirable.

The sensitizing agent allows a transfer at a chosen desirable pH which may be anything up to a pH of approximately 7.5 depending upon the temperature employed, the degree of agitation and the clarity of water phase required.

Although operation at room temperature will produce a satisfactory product, raising the temperature below the boiling point produces the following improvements: It enhances the sensitizing action of the sensitizing agent, increases the solubility of the polymer in the cement phase, and reduces the viscosity of the cement, which, as a consequence, favors intimate mixing.

The process lends itself to the incorporation of compounding ingredients into the cement whether or not the polymer is ultimately vulcanized. The compounding ingredients include liquids such as oils, liquid antiozonants, etc., as well as pigments, including blacks, sulfur, antioxidants, etc. The compounding ingredients may be incorporated in the latex; they may be added with oil or hydrocarbon solvents; or they may be incorporated in the elastomer in any other known method of compounding rubber cements. For example, to produce a cement which includes a carbon black, the carbon black may be added as a water or hydrocarbon slurry to the system at any stage of the operation. If the final product calls for extension with a processing oil, the processing oil may be added prior to the addition of acid in order to give a more fluid cement and a more intimate dispersion of the oil in the product.

An essential part of this invention is that the cement is normally heterogeneous, containing a dispersion of water and elastomer in the solvent phase. The cement can be used directly as a cement or it can be converted to a desolventized, dry form of elastomer, which can contain one or more of the compounding ingredients and/or other admixed material mentioned above. The transferred elastomer cement can be desolventized by removing a substantial portion of the solvent and/or water by evaporation or distillation, as by steam distillation or any of the known methods of recovering an elastomer from a cement of same. Incorporation of carbon black and other pigments in the aforementioned cement results in excellent dispersions in the dry product, equal to dispersions made in an all-hydrocarbon system and better than dispersions obtained by coprecipitating an intimate mixture of pigments and elastomer latex from a fluid mixture.

The transferred elastomer cements are used wherever rubber and synthetic rubber cement products have been used, as for adhesives, for coating fabrics, etc. The cements are characterized by their ready acceptance of pigments, oils, curatives, other cements, etc. The high degree of dispersion resulting from such intimate mixing is accomplished without mechanical shear on the dried or semi-dry materials.

The invention is illustrated by the following examples, in which all parts are by weight unless otherwise indicated.

EXAMPLE 1

One hundred twenty-five grams of SBR latex of 23.6 percent total solids content, were mixed with 0.75 ml. of a 2 percent aqueous solution of Trademark "Carbowax 20M" with agitation. To this, 88.5 grams of hexane were added with agitation. The latex phase disappeared and a single homogeneous turbid phase formed quickly. Then 3.16 ml. of a 10 percent sulfuric acid solution (aqueous) were added with rapid agitation for one minute. Approximately 50 percent of the water introduced with the latex separated quickly as essentially clear, rubber-free aqueous effluent. The aqueous phase had a pH of 6.53. More rubber-free aqueous effluent separated on standing and upon mild stirring. About 75 percent of the total water content could be removed by centrifuging.

EXAMPLE 2

One hundred twenty-five grams of SBR latex of 23.6 percent total solids content, were mixed with 2.5 ml. of a 5 percent solution of "Tetronic 908" (27000 molecular weight) with mild agitation in a Waring blender. To this 88.5 grams of hexane were added with fast agitation. The aqueous latex phase disappeared and a single turbid phase formed quickly. Then 3.3 ml. of a 10 percent sulfuric acid solution (aqueous) were added and rapid agitation continued for about one minute. Essentially rubber-free aqueous effluent separated quickly. It had a pH of 9.0. After draining the aqueous effluent a fluid cement was left behind which contained some residual water in highly dispersed form.

EXAMPLE 3

One hundred twenty-five grams of SBR latex of 23.6 percent total solids were mixed with 0.75 ml. of a 2 percent aqueous solution of polyethylene glycol compound of 20000 molecular weight (Carbowax 20M) with slow agitation in a Waring blender. Shortly thereafter a solution of 10.3 grams of Dutrex 726 oil in 88.5 grams of hexane was added with fast agitation. The aqueous latex phase disappeared and a single turbid phase formed quickly (almost instantaneously). Then 3.3 ml. of a 10 percent sulfuric acid solution (aqueous) were added and rapid agitation continued for about one minute. A clear, rubber-free aqueous effluent separated rapidly. It had a pH of 6.02. More rubber-free aqueous effluent separated on standing and upon mild stirring, and was separated. Roughly 30 percent of the total water introduced remained in the cement in a highly dispersed state.

EXAMPLE 4

Sixty-two grams of SBR latex of 23.6 percent total solids were admixed with 0.36 ml. of a 2 percent aqueous solution of Carbowax 20M with slow agitation in a Waring blender. Shortly thereafter a solution of 8.4 grams of Dutrex 726 oil in 44 grams of hexane was added with fast agitation. The aqueous latex phase disappeared and a single turbid phase formed quickly. Then 1.8 ml. of a 10 percent sulfuric acid solution (aqueous) was added and rapid agitation was continued for about one minute. A clear, rubber-free aqueous effluent separated rapidly, from the cement. To the resulting cement were added with fast agitation 64.5 grams of a 15 percent commercial polybutadiene solution in hexane (Diene) and subsequently 338 grams of a 5 percent water slurry of carbon black (ISAF). The carbon black slurry was obtained by mixing the carbon black and water for 10 minutes in a Waring blender with high speed agitation. About one minute after addition of the carbon black slurry a rubber and carbon black free aqueous effluent separated. It had a pH of 6.35. The resulting hexane cement containing SBR, Diene, oil, carbon black and some residual water was fluid and homogeneous.

The carbon black in the cement was in a highly dispersed state.

EXAMPLE 5

Fifty grams of polyisoprene latex (Shell 700) having a total solids content of 62 percent were mixed with 100 grams of water and 0.75 ml. of a 2 percent aqueous solution of Carbowax 20M with slow agitation in a Waring blender. To this 88 grams of hexane were added with fast agitation. The aqueous phase disappeared and a single turbid phase formed quickly. Then 0.87 ml. of a 10 percent aqueous sulfuric acid solution were added and fast agitation continued for one minute. A clear rubber-free aqueous effluent separated rapidly. After removal of the aqueous effluent the cement was diluted with 40 grams of hexane (under agitation) to obtain the desired fluidity.

EXAMPLE 6

One hundred fifty grams of natural rubber latex of 20 percent D.R.C. which had been aerated for the purpose of reducing its ammonia content, were mixed with 0.75 ml. of a 2 percent aqueous solution of Carbowax 20M with mild agitation in a Waring blender. To this 100 grams of hexane were added with fast agitation. The aqueous phase disappeared and a single turbid phase formed quickly. Then 1.2 ml. of a one percent, aqueous formic acid solution were added and fast agitation continued for about one minute. A clear rubber-free aqueous effluent separated rapidly. It had a pH of 7.3. The aqueous effluent was removed and the remainder diluted under agitation with 96 grams of hexane in order to obtain suitable cement fluidity.

EXAMPLE 7

Seventy-five grams of deammoniated natural rubber latex of 20 percent D.R.C. were mixed with 0.37 ml. of a 2 percent aqueous solution of Carbowax 20M with mild agitation in a Waring blender. To this was added a solution of 5.6 grams Dutrex 726 oil in fifty grams of hexane with fast agitation. The aqueous latex phase disappeared and a single turbid phase formed quickly. Then 0.6 ml. of a 1 percent aqueous formic acid solution were added and rapid agitation continued for about one minute. A clear, rubber-free aqueous effluent separated rapidly. It was removed and to the remainder were added with agitation 60 grams of hexane to give the cement the desired fluidity. Finally 203 grams of a 5 percent aqueous carbon (ISAF) slurry were added with high speed agitation. The carbon black slurry was prepared by mixing the carbon black and water for 10 minutes in a Waring blender with high speed agitation. About one minute after addition of the carbon black a rubber and carbon black free effluent separated. It had a pH of 6.7. The resulting hexane cement containing unmasticated natural rubber, oil, carbon black and some residual water was fluid and homogeneous. The carbon black in the cement was in a highly dispersed state.

The efficiency of various sensitizing agents is illustrated in the following table:

| Sensitizing agent | Percent rubber left in latex | transfer time, minutes | Hydrophilic-hydrophobic balance | pH |
| --- | --- | --- | --- | --- |
| Carbowax 20M | 0.07 | 0.5 | 80/20/85/15 | 6.0 |
| Tetronic 908 | 0.08 | 0.7 | 80/20/90/10 | 6.0 |
| Pluronic F-108 | 0.07 | 1.0 | 80/20 | 6.0 |
| Polywachs 12000 | 0.30 | 4.0 | 100/00 | 6.0 |
| None | 9.0 | | | 6.0 |

It is evident from the above table that the efficiency of transfer agents containing hydrophobic groups is greater than that of those containing only hydrophilic groups. On the other hand, excessive hydrophobic proportions tend towards water insolubility and therefore less effectiveness as a sensitizing agent.

Figure 2:
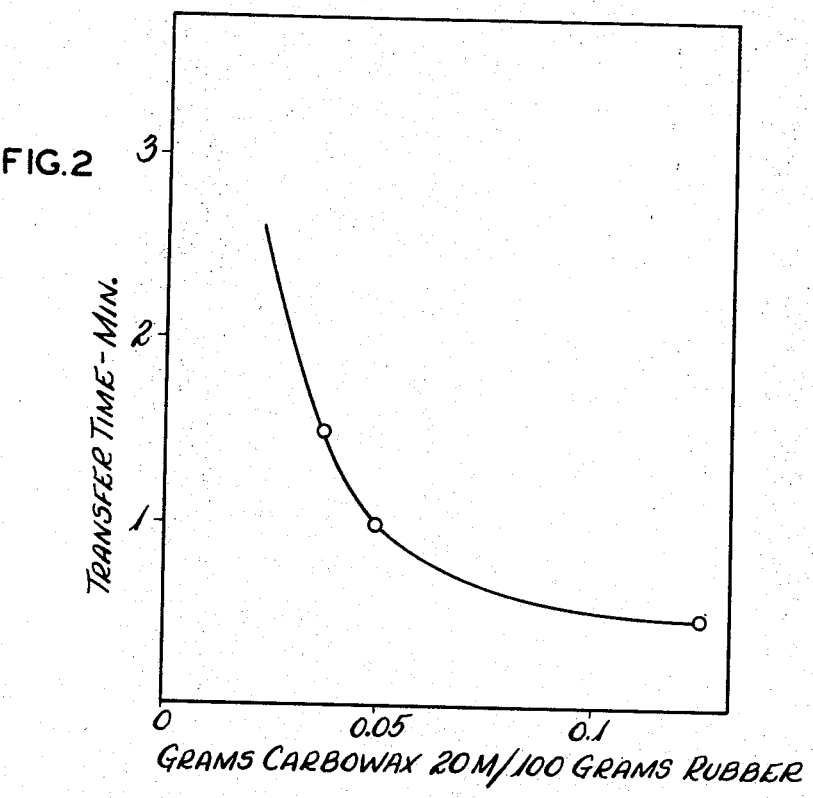

FIG. 2 shows the effect of varying the amount of Carbowax 20M. This figure is based on data given in the following table which gives various comparative data regarding the effectiveness of Carbowax 20M under different conditions.

EFFECT OF VARIOUS FACTORS ON TRANSFER TIME OF SBR LATEX TO HEXANE CEMENT

TRANSFER TIME VERSUS AMOUNT OF CARBOWAX
(At pH of 6.2; RT; 12,500 r.p.m.)

| Carbowax 20M, p.p.hr | 0 | 0.03 | 0.05 | 0.10 |
| --- | --- | --- | --- | --- |
| Transfer time, min | | 1.5 | 1.0 | 0.5 |

TRANSFER TIME VERSUS MIXING SPEED
(At pH of 5.8, R.T; 0.04 p.p.hr. of Carbowax 20M)

| Mixing speed, r.p.m | 10,000 | 12,500 |
| --- | --- | --- |
| Transfer time, min | 2.25 | 1.75 |

TRANSFER TIME VERSUS TEMPERATURE
(At pH of 5.6; 10,000 r.p.m.; 0.04 p.p.hr. of Carbowax 20M)

| Temperature, °C | 30 | 55 |
| --- | --- | --- |
| Transfer time, min | 2.25 | 1.25 |

TRANSFER TIME VERSUS pH
(10,000 r.p.m.; 0.04 p.p.hr. of Carbowax 20M; 50° C.)

| pH | 5.9 | 2.7 |
| --- | --- | --- |
| Transfer time, min | 1.25 | 0.75 |

We claim:
1. The method of transferring elastomeric polymer from a latex to a solvent for the polymer which solvent is immiscible with the latex, and the preparation of a cement of the polymer in said solvent, the latex comprising an aqueous dispersion of the elastomeric polymer which is dispersed with a dispersing agent which is at least in part an acid-decomposable soap, which method comprises admixing with the latex (1) a substantial frac- tion of a percent of water-soluble polyether sensitizing agent which has a molecular weight of substantially 4,000 to 27,000, which sensitizing agent contains only sufficient hydrophilic groups to render it water soluble, the sensitizing agent being selected from the class consisting of polyalkylene polyesters and reaction products of a polyalkylene oxide and a coupling agent of the class consisting of (a) reaction products of epichlorhydrin and a bisphenol, (b) polyalkylene polyamines containing 2 to 4 carbon atoms in each alkylene group and (c) a diisocyanate, the amount of the sensitizing agent which is added being sufficient to give substantially complete transfer of the elastomer from the latex to the solvent when acid is added as described in part (3) hereof, (2) adding a solvent for the polymer, the solvent being added to the latex with the sensitizing agent or thereafter, (3) adding an acid which converts the soap to salt and non-stabilizing acid thereby causing a phase inversion and thereafter separating aqueous effluent which has a pH no greater than substantially 7.5 from the cement which is produced.

2. The method of claim 1 in which the pH of the water phase is maintained in the range of 1.0 to 7.5.

3. The method of claim 2 in which an acid is admixed with the latex, sensitizing agent and solvent to control the pH of the mixture.

4. The method of claim 2 in which the latex, solvent and sensitizing agent are agitated at an elevated temperature below the boiling point of both the solvent and the aqueous phase of the latex.

5. The method of claim 1 in which the sensitizing agent is an addition product of (1) polyethylene glycol of substantially 6,000 molecular weight and (2) a diepoxide of epichlorhydrin and a bisphenol, the addition product having a molecular weight of substantially 15,000 to 20,000.

6. The method of claim 1 in which the sensitizing agent is a reaction product of polyethylene-polypropylene oxide block copolymer with a diamine, the addition product having a molecular weight of substantially 27,000.

7. The method of claim 1 in which the sensitizing agent is polyethylene-polypropylene oxide block copolymer with a molecular weight of substantially 16,000.

8. The method of claim 1 in which the sensitizing agent is polyethylene oxide with a molecular weight of 11,000 to 12,000.

9. The method according to claim 1 in which pigments, oils and/or compounding ingredients are dispersed in the transferred elastomer cement.

10. The method of claim 1 in which an aqueous dispersion of a compounding ingredient is dispersed in the transferred elastomer cement.

11. The method of claim 1 in which a compound ingredient dispersed in an elastomer solvent is dispersed in the transferred elastomer cement.

12. The method of claim 1 in which a dry compounding ingredient is dispersed in the transferred elastomer cement.

13. A method of claim 1 in which another elastomer is mixed with the transferred elastomer cement.

14. A method as claimed in claim 1 characterized in that a rubber extending oil is added to the latex prior to the transfer to a cement.

15. A method as claimed in claim 1 characterized in that carbon black is added to the latex prior to the transfer to a cement.

16. A method as claimed in claim 1 characterized in that another elastomer is added with the solvent used in the transfer.

17. A method as claimed in claim 1 characterized by removing the solvent and water from the transferred elastomer cement.

References Cited
FOREIGN PATENTS

| | | |
|---|---|---|
| 485,503 | 8/1952 | Canada. |
| 586,489 | 11/1959 | Canada. |
| 1,018,376 | 1/1966 | Great Britain. |

ALLAN LIEBERMAN, Primary Examiner

U.S. Cl. X.R.

260—33.6, 33.8, 41, 41.5, 739, 742, 746, 759, 760

PO-1050
(5/69)

UNITED STATES PATENT OFFICE
CERTIFICATE OF CORRECTION

Patent No. 3,533,982     Dated October 13, 1970

Inventor(s) Ernst Schmidt and John H. Williams

It is certified that error appears in the above-identified patent and that said Letters Patent are hereby corrected as shown below:

Col. 7, line 6, "polyesters" should read --polyethers--

SIGNED AND SEALED
MAR 9 1971

(SEAL)
Attest:

Edward M. Fletcher, Jr.
Attesting Officer

WILLIAM E. SCHUYLER, JR.
Commissioner of Patents